US012790907B2

(12) United States Patent
Jacob

(10) Patent No.: US 12,790,907 B2
(45) Date of Patent: Nov. 10, 2026

(54) BALL-ACTIVATED FLAPPER VALVE FOR DOWNHOLE FLOAT EQUIPMENT

(71) Applicant: INNOVEX INTERNATIONAL, INC., Humble, TX (US)

(72) Inventor: Jobby T. Jacob, Humble, TX (US)

(73) Assignee: INNOVEX INTERNATIONAL, INC., Humble, TX (US)

( * ) Notice: Subject to any disclaimer, the term of this patent is extended or adjusted under 35 U.S.C. 154(b) by 0 days.

(21) Appl. No.: 19/314,212

(22) Filed: Aug. 29, 2025

(65) Prior Publication Data

US 2026/0071508 A1 Mar. 12, 2026

Related U.S. Application Data

(60) Provisional application No. 63/691,416, filed on Sep. 6, 2024.

(51) Int. Cl.

*E21B 23/04* (2006.01)
*E21B 34/10* (2006.01)
*F16K 31/18* (2006.01)

(52) U.S. Cl.

CPC .......... *E21B 23/0413* (2020.05); *E21B 34/10* (2013.01); *F16K 31/18* (2013.01)

(58) Field of Classification Search

CPC .... E21B 23/0413; E21B 34/10; E21B 34/142; F16K 31/18

See application file for complete search history.

(56) References Cited

U.S. PATENT DOCUMENTS

| | | | | |
|---|---|---|---|---|
| 2,212,086 | A * | 8/1940 | Thornhill | E21B 21/10 166/194 |
| 4,655,247 | A * | 4/1987 | Westra | E21B 21/10 251/368 |
| 2012/0199349 | A1* | 8/2012 | Themig | E21B 33/12 166/135 |
| 2017/0002628 | A1* | 1/2017 | Van Petegem | E21B 34/142 |

* cited by examiner

*Primary Examiner* — Kristyn A Hall

(74) *Attorney, Agent, or Firm* — MH2 Technology Law Group, LLP

(57) ABSTRACT

A downhole tool includes a mandrel and a tube positioned within the mandrel. The tube defines an inner shoulder proximate to a lower end thereof. The downhole tool also includes a retainer positioned within the mandrel and proximate to an upper end of the tube. A first impediment is configured to move axially between a maximum lower position and a maximum upper position. The first impediment is in the maximum lower position when the first impediment is in contact with the inner shoulder. The first impediment is in the maximum upper position when the first impediment is in contact with the retainer. The retainer is shaped such that a center of the first impediment is offset from a central longitudinal axis of the retainer when the first impediment is in the maximum upper position.

20 Claims, 4 Drawing Sheets

BALL-ACTIVATED FLAPPER VALVE FOR DOWNHOLE FLOAT EQUIPMENT

CROSS-REFERENCE TO RELATED APPLICATIONS

This application claims priority to U.S. Provisional Patent Application No. 63/691,416, filed on Sep. 6, 2024, which is incorporated by reference.

BACKGROUND

A float collar may be positioned between two casing strings in a wellbore. The float collar may have a ball-activated flapper valve positioned at least partially therein. The float collar with the flapper valve may serve to reduce surge pressure and casing running time by allowing displaced wellbore fluids to flow into and (e.g., upward) through the casing while running in-hole.

The flapper valve may include a ball and a retainer. When the wellbore fluids exert an upward force on the ball (e.g., during run-in), the ball contacts the retainer, which centers the ball within the float collar. This creates an annulus around the ball through which the wellbore fluids may flow upward. Due to the relatively small size of this annulus, solids (e.g., cuttings, debris, etc.) in the wellbore fluids may accumulate at this location. In other words, the solids may be too large to pass through the annulus and may thus become stuck and clog the annulus. This may slow the run-in process. In addition, with the upward flow at least partially blocked by the solids in the annulus, the upward force exerted by the wellbore fluids may progressively increase, which may break the retainer.

SUMMARY

A downhole tool is disclosed. The downhole tool includes a mandrel and a tube positioned within the mandrel. The tube defines an inner shoulder proximate to a lower end thereof. The downhole tool also includes a retainer positioned within the mandrel and proximate to an upper end of the tube. A first impediment is configured to move axially between a maximum lower position and a maximum upper position. The first impediment is in the maximum lower position when the first impediment is in contact with the inner shoulder. The first impediment is in the maximum upper position when the first impediment is in contact with the retainer. The retainer is shaped such that a center of the first impediment is offset from a central longitudinal axis of the retainer when the first impediment is in the maximum upper position. The downhole tool also includes one or more valves positioned radially between the mandrel and the tube.

A float collar is also disclosed. The float collar includes a mandrel. The float collar also includes a tube configured to be positioned within the mandrel. The tube defines an inner shoulder proximate to a lower end thereof. The float collar also includes a first impediment configured to be positioned within the tube. The float collar also includes a retainer positioned within the mandrel and proximate to an upper end of the tube. The retainer includes an annular body and a plurality of fingers that extend radially inward from the body. An intersection of the fingers is radially offset from a central longitudinal axis of the annular body. Each adjacent pair of the fingers defines an opening therebetween. A first of the openings is larger than a remainder of the openings. The central longitudinal axis extends through the first opening. The first impediment is unable to pass through any of the openings. The first impediment is configured to move axially between a maximum lower position and a maximum upper position. The first impediment is in the maximum lower position when the first impediment is in contact with the inner shoulder. The first impediment is in the maximum upper position when the first impediment is in contact with the fingers. The fingers are shaped such that a center of the first impediment is offset from the central longitudinal axis when the first impediment is in the maximum upper position. The float collar also includes one or more valves positioned radially between the mandrel and the tube.

A method for operating a float collar in a wellbore is also disclosed. The method includes running the float collar into the wellbore. The float collar includes a mandrel and a tube positioned within the mandrel. The tube defines an inner shoulder proximate to a lower end thereof. The float collar also includes a retainer positioned within the mandrel and proximate to an upper end of the tube. A first impediment is configured to move axially between a maximum lower position and a maximum upper position. The first impediment is in the maximum lower position when the first impediment is in contact with the inner shoulder. The first impediment is in the maximum upper position when the first impediment is in contact with the retainer. The retainer is shaped such that a center of the first impediment is offset from a central longitudinal axis of the retainer when the first impediment is in the maximum upper position. The float collar also includes one or more valves positioned radially between the mandrel and the tube. The method also includes increasing a pressure of a fluid in the float collar, which causes the tube and the first impediment to move out of the mandrel. The one or more valves are in an inactive state when the tube is in the mandrel. The one or more valves are in an active state when the tube is out of the mandrel.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

Figure 1:
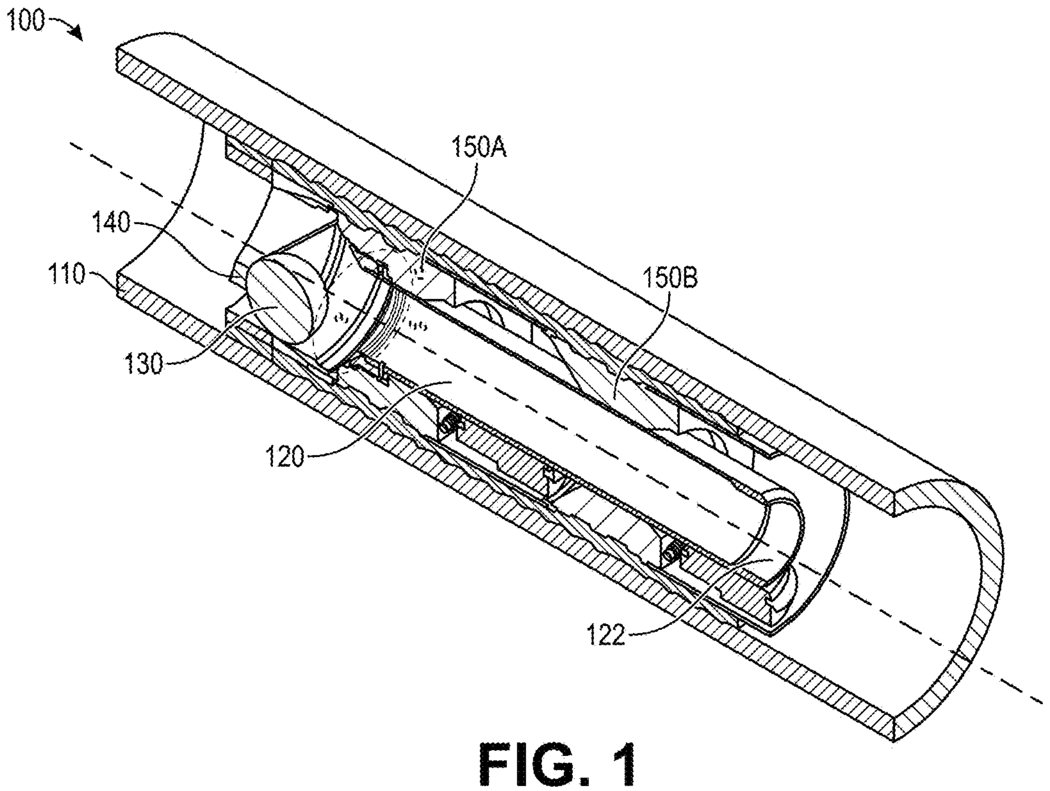
FIG. 1 illustrates a cross-sectional perspective view of a downhole tool, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

FIG. 1 illustrates a cross-sectional perspective view of a downhole tool 100, according to an embodiment. The downhole tool 100 may be or include a float collar. The float collar 100 may include an annular mandrel 110. The float collar 100 may also include an annular tube 120 that is positioned within the mandrel 110. The tube 120 may include an inner shoulder 122 proximate to a lower end thereof. In one embodiment, the tube 120 and/or inner shoulder 122 may be omitted.

The float collar 100 may also include a first impediment 130 that is positioned within the mandrel 110. More particularly, the first impediment 130 may be configured to move axially within the tube 120. The first impediment 130 may be or include a ball, a dart, a pill, or the like.

The float collar 100 may also include a retainer 140 that is positioned within the mandrel 110. The retainer 140 may be positioned above the tube 120 and/or the first impediment 130. The first impediment 130 may be configured to move axially between the shoulder 122 of the tube 120 and the retainer 140; however, the first impediment 130 may not pass through either one. In other words, the first impediment 130 may be retained between the shoulder 122 and the retainer 140.

The float collar 100 may also include one or more valves (two are shown 150A, 150B) that are positioned within the mandrel 110. For example, the float collar 100 may include two flapper valves 150A, 150B that are spaced axially apart from one another and positioned (e.g., radially) between the mandrel 110 and the tube 120. As described below, the valves 150A, 150B may be in a first (e.g., inactive) state when the tube 120 is positioned within the mandrel 110. In the inactive state, the valves 150A, 150B remain positioned between the mandrel 110 and the tube 120 and are unable to actuate (e.g., between open and closed positions). However, once the tube 120 moves (e.g., downward) out of the mandrel 110, the valves 150A, 150B may be in a second (e.g., active) state. In the active state, the valves 150A, 150B may serve as one-way (e.g., check) valves that may open to permit fluid to flow downward through the mandrel 110 and close to prevent the fluid from flowing upward through the mandrel 110.

Figure 2:
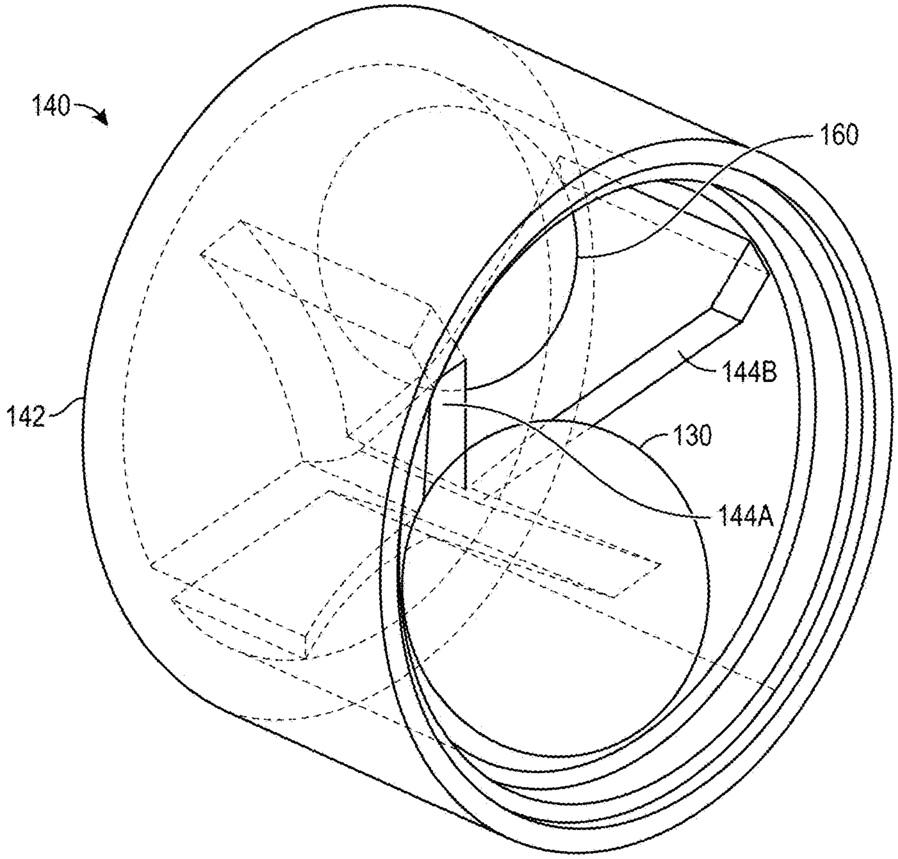
FIG. 2 illustrates a perspective view of a retainer and a first impediment (e.g., ball) in the downhole tool, according to an embodiment.
Figure 3:
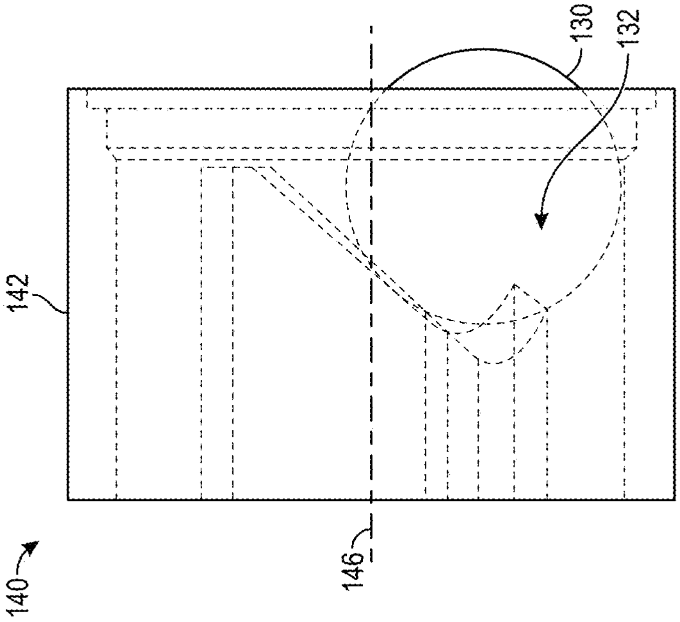
FIG. 3 illustrates a cross-sectional side view of the retainer and the first impediment, according to an embodiment.
Figure 4:
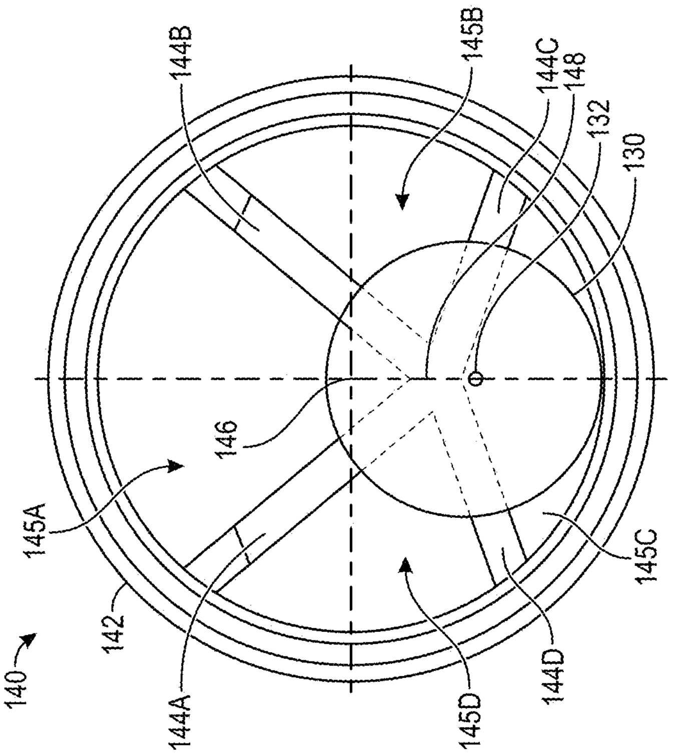
FIG. 4 illustrates a top view of the retainer and the first impediment, according to an embodiment.

FIGS. 2-4 illustrate a perspective view, a cross-sectional side view, and a top view of the first impediment 130 and the retainer 140, according to an embodiment. In FIGS. 2-4, the dashed lines show portions of the float collar 100 that would otherwise not be visible. The retainer 140 may include an annular body 142 and one or more fingers (four are shown: 144A-144D) that extend radially inward from the body 142. Although four fingers 144A-144D are shown, in other embodiments, the number of fingers 144A-144D may be more or less than four. In the example shown, the fingers 144A-144D may form a modified "X" shape.

The retainer 140 (e.g., the fingers 144A-144D) may be configured (e.g., shaped) such that, when the first impediment 130 is pushed (e.g., upward) into contact with the retainer 140 by wellbore fluids, the first impediment 130 becomes offset from a central longitudinal axis 146 through the body 142 of the retainer 140 (and/or the mandrel 110). More particularly, the first impediment 130 may contact the fingers 144A-144D and move/roll along the sloped surfaces thereof until it comes to rest in a maximum upward position, as shown in FIGS. 3 and 4. In the maximum upward position, a center 132 of the first impediment 130 is misaligned with (e.g., radially offset from) the central longitudinal axis 146 through the body 142 of the retainer 140. In the example shown, the first impediment 130 may be in contact with the inner surface of the body 142 in the maximum upward position.

In the embodiment shown, the retainer 140 includes four fingers 144A-144D, which may define four openings 145A-145D therebetween. At least one of the openings (e.g., opening 145A) may be larger than the rest. More particularly, an intersection 148 of the fingers 144A-144D may be (e.g., radially offset) from the central longitudinal axis 146 through the body 142 of the retainer 140. The central longitudinal axis 146 may extend through the larger opening 145A. An angle between the fingers 144A, 144B that define the larger opening 145A may be from about 60 degrees to about 180 degrees or about 90 degrees to about 150 degrees.

The gap between the first impediment 130 and the inner surface of the body 142 that defines the first opening 145A may be larger than the annulus in the conventional float collar where the impediment is centered within the retainer. This may allow for more and/or larger solids to pass therethrough, which may reduce or prevent clogging and the potential damage and/or failure that may result therefrom.

Figure 6:
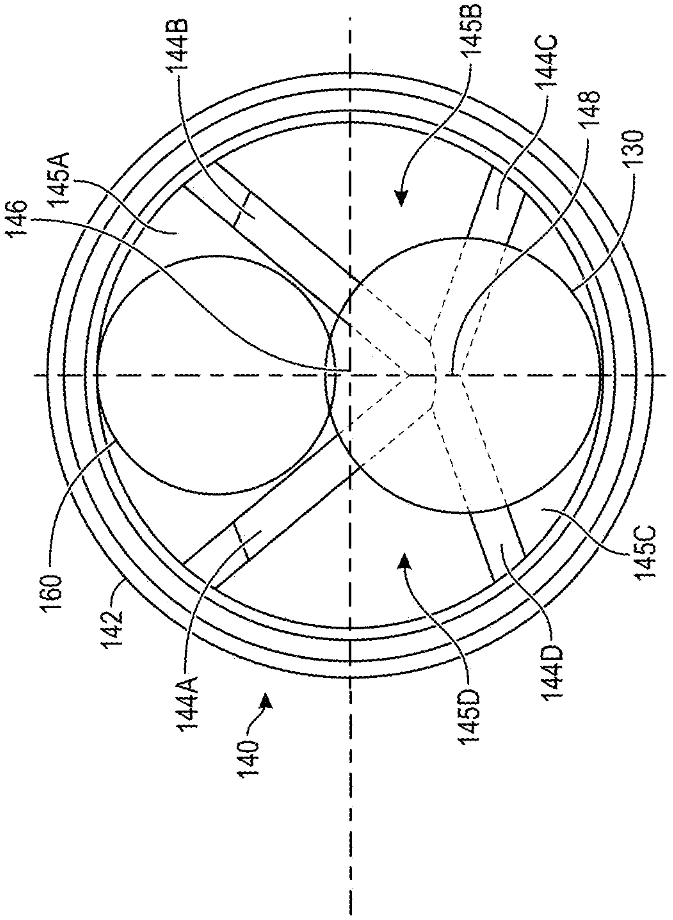
FIG. 6 illustrates a top view of the retainer and the second impediment, according to an embodiment.
Figure 5:
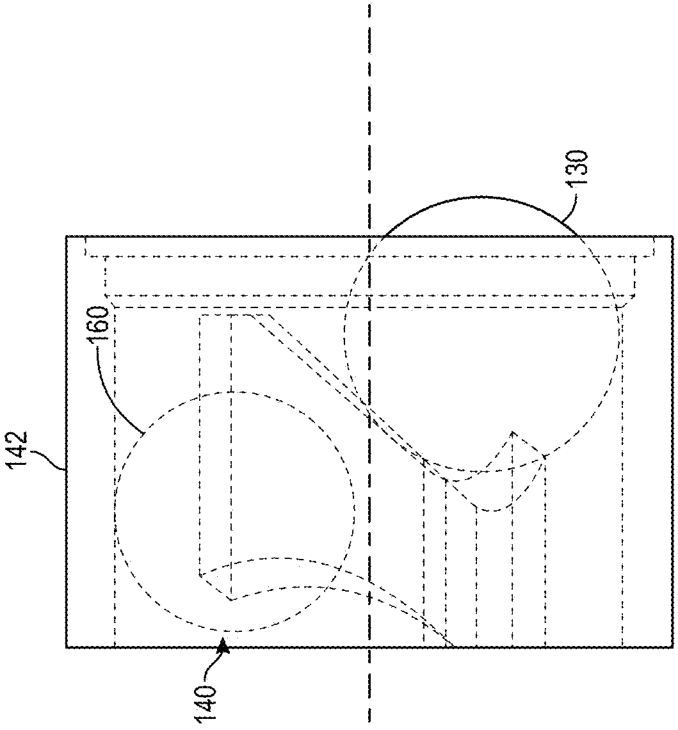
FIG. 5 illustrates a cross-sectional side view of the retainer and a second impediment (e.g., ball), according to an embodiment.

FIGS. 5 and 6 illustrate a cross-sectional side view and a top view of the retainer 140 and a second impediment 160, according to an embodiment. The first impediment 130 may not be able to pass through any of the openings 145A-145D. However, a second impediment 160 may be able to pass through the larger opening 145A. The second impediment 160 may be smaller than the first impediment 130. In one embodiment, the second impediment 160 may not be able to pass through the smaller openings 145B-145D.

Figure 7:
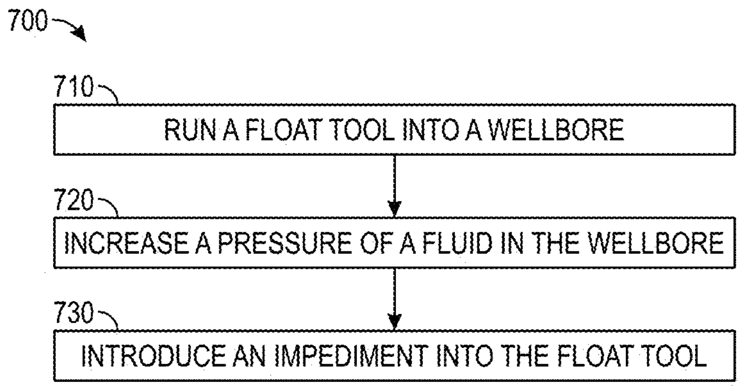
FIG. 7 illustrates a flowchart of a method for operating the downhole tool in a wellbore, according to an embodiment.

FIG. 7 illustrates a flowchart of a method 700 for operating the float collar 100 in a wellbore, according to an embodiment. An illustrative order of the method 700 is provided below; however, one or more steps of the method 700 may be performed in a different order, simultaneously, repeated, or omitted.

The method 700 may include running the float collar 100 into a wellbore, as at 710. As the float collar 100 moves downward in the wellbore, the fluid in the wellbore (i.e., the wellbore fluid) may exert an upward force on the first impediment 130, which may move the first impediment upward and into contact with the retainer 140. Accordingly, the first impediment 130 may move into the maximum upward position, which is offset from the central longitudinal axis 146 of the retainer 140.

The method 700 may also include increasing a pressure of a fluid in the float collar 100, as at 720. Once the float collar 100 reaches the desired position in the wellbore, the pressure in the wellbore may be increased (e.g., using a pump at the surface). This may increase the pressure of the fluid in the float collar 100, which may exert a downward force on the first impediment 130. The downward force may move the first impediment 130 into contact with the inner shoulder 122 of the tube (e.g., a maximum downward position). As the pressure/force continues to increase, the tube 120 may release from the mandrel 110, and both the tube 120 and the first impediment 130 may move (e.g., fall) out of the mandrel 110. This may actuate the valves 150A, 150B from the inactive state to the active state.

In the maximum upward position, the centerline of the first impediment 130 may be offset from the central longitudinal axis of the tube 120. In the maximum downward position, the centerline of the first impediment 130 may be substantially aligned with the central longitudinal axis of the tube 120. In other words, the first impediment 130 may be offset or aligned with the central longitudinal axis of the tube 120 depending on whether the first impediment 130 is in the maximum upward position or the maximum downward position.

The method 700 may also include introducing a second impediment 160 into the float collar 100, as at 730. The second impediment 160 may pass through the larger opening 145A in the retainer 140. Accordingly, the second impediment 160 may proceed to another downhole tool that is below the float collar 100.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A downhole tool, comprising:

a mandrel;

a tube configured to be positioned within the mandrel, wherein the tube defines an inner shoulder proximate to a lower end thereof;

a first impediment;

a retainer positioned within the mandrel and proximate to an upper end of the tube, wherein the first impediment is configured to move axially between a maximum lower position and a maximum upper position, wherein the first impediment is in the maximum lower position when the first impediment is in contact with the inner shoulder, wherein the first impediment is in the maximum upper position when the first impediment is in contact with the retainer, and wherein the retainer is shaped such that a center of the first impediment is offset from a central longitudinal axis of the retainer when the first impediment is in the maximum upper position; and one or more valves positioned radially between the mandrel and the tube.

2. The downhole tool of claim 1, wherein the downhole tool comprises a float collar.

3. The downhole tool of claim 1, wherein the retainer comprises:

an annular body; and a plurality of fingers that extend radially inward from the body.

4. The downhole tool of claim 3, wherein the first impediment is in contact with an inner surface of the annular body of the retainer in the maximum upper position.

5. The downhole tool of claim 3, wherein an intersection of the fingers is radially offset from the central longitudinal axis.

6. The downhole tool of claim 3, wherein the first impediment is configured to contact the fingers and roll along sloped surfaces of the fingers until the first impediment comes to rest in the maximum upper position.

7. The downhole tool of claim 3, wherein each adjacent pair of the fingers defines an opening therebetween, and wherein the first impediment is unable to pass through any of the openings.

8. The downhole tool of claim 7, wherein a first of the openings is larger than a remainder of the openings.

9. The downhole tool of claim 8, wherein the central longitudinal axis extends through the first opening.

10. The downhole tool of claim 1, wherein the one or more valves are in an inactive state when the tube is positioned within the mandrel, and wherein the one or more valves in the inactive state remain positioned between the mandrel and the tube and are unable to actuate between open and closed positions.

11. The downhole tool of claim 10, wherein the tube is configured to release from the mandrel, causing the tube and the first impediment to move out of the mandrel, which actuates the one or more valves from the inactive state to an active state.

12. The downhole tool of claim 11, wherein the one or more valves in the active state serve as one-way valves that open to permit fluid to flow downward through the mandrel and close to prevent the fluid from flowing upward through the mandrel.

13. A float collar, comprising:
a mandrel;
a tube configured to be positioned within the mandrel, wherein the tube defines an inner shoulder proximate to a lower end thereof;
a first impediment configured to be positioned within the tube;
a retainer positioned within the mandrel and proximate to an upper end of the tube, wherein:
the retainer comprises an annular body and a plurality of fingers that extend radially inward from the annular body,
an intersection of the fingers is radially offset from a central longitudinal axis of the annular body,
each adjacent pair of the fingers defines an opening therebetween,
a first of the openings is larger than a remainder of the openings,
the central longitudinal axis extends through the first opening,
the first impediment is unable to pass through any of the openings,
the first impediment is configured to move axially between a maximum lower position and a maximum upper position,
the first impediment is in the maximum lower position when the first impediment is in contact with the inner shoulder,
the first impediment is in the maximum upper position when the first impediment is in contact with the fingers, and
the fingers are shaped such that a center of the first impediment is offset from the central longitudinal axis when the first impediment is in the maximum upper position; and
one or more valves positioned radially between the mandrel and the tube.

14. The float collar of claim 13, wherein the first impediment is configured to contact the fingers and roll along sloped surfaces of the fingers until the first impediment comes to rest in the maximum upper position, and wherein the first impediment is in contact with an inner surface of the annular body in the maximum upper position.

15. The float collar of claim 14, wherein the one or more valves are in an inactive state when the tube is positioned within the mandrel, wherein the one or more valves in the inactive state remain positioned between the mandrel and the tube and are unable to actuate between open and closed positions, wherein the tube is configured to release from the mandrel, causing the tube and the first impediment to move out of the mandrel, which actuates the one or more valves from the inactive state to an active state, and wherein the one or more valves in the active state serve as one-way valves that open to permit fluid to flow downward through the mandrel and close to prevent the fluid from flowing upward through the mandrel.

16. A method for operating a float collar in a wellbore, the method comprising:
running the float collar into the wellbore, wherein the float collar comprises:
a mandrel;
a tube positioned within the mandrel, wherein the tube defines an inner shoulder proximate to a lower end thereof;
a first impediment;
a retainer positioned within the mandrel and proximate to an upper end of the tube, wherein the first impediment is configured to move axially between a maximum lower position and a maximum upper position, wherein the first impediment is in the maximum lower position when the first impediment is in contact with the inner shoulder, wherein the first impediment is in the maximum upper position when the first impediment is in contact with the retainer, and wherein the retainer is shaped such that a center of the first impediment is offset from a central longitudinal axis of the retainer when the first impediment is in the maximum upper position; and
one or more valves positioned radially between the mandrel and the tube; and
increasing a pressure of a fluid in the float collar, which causes the tube and the first impediment to move out of the mandrel, wherein the one or more valves are in an inactive state when the tube is in the mandrel, and wherein the one or more valves are in an active state when the tube is out of the mandrel.

17. The method of claim 16, wherein, as the float collar is run into the wellbore, the fluid exerts an upward force on the first impediment, which moves the first impediment upward and into the maximum upper position.

18. The method of claim 16, wherein increasing the pressure of the fluid exerts a downward force on the first impediment, causing the first impediment to move into the maximum lower position, and wherein, as the pressure continues to increase, the tube releases from the mandrel, and the tube and the first impediment move out of the mandrel.

19. The method of claim 16, wherein the center of the first impediment is aligned with the central longitudinal axis when the first impediment is in the maximum lower position.

20. The method of claim 16, further comprising introducing a second impediment into the float collar, wherein the retainer defines a plurality of openings including a first opening that is larger than a remainder of the openings, and wherein the second impediment passes through the first opening and proceeds to another downhole tool that is below the float collar.

* * * * *